United States Patent
Pollock

(10) Patent No.: US 8,537,979 B1
(45) Date of Patent: Sep. 17, 2013

(54) VOICE RESPONSE SYSTEM WITH LIVE AGENT ASSISTED INFORMATION SELECTION AND MACHINE PLAYBACK

(75) Inventor: Steven Samuel Pollock, Los Altos, CA (US)

(73) Assignee: West Interactive Corporation II, Omaha, NE (US)

( * ) Notice: Subject to any disclaimer, the term of this patent is extended or adjusted under 35 U.S.C. 154(b) by 0 days.

(21) Appl. No.: 13/215,357

(22) Filed: Aug. 23, 2011

Related U.S. Application Data

(63) Continuation of application No. 10/819,572, filed on Apr. 6, 2004, now Pat. No. 8,027,458.

(51) Int. Cl.
*H04M 1/64* (2006.01)

(52) U.S. Cl.
USPC .......... 379/88.04; 379/88.16; 379/88.17; 379/88.18; 379/265.11; 455/412.1; 455/414.3; 704/270.1; 704/275; 709/201

(58) Field of Classification Search
USPC ..... 370/259–271, 351–356; 379/67.1–88.28, 379/92.01–93.03, 93.12, 93.13, 102.01–102.03, 379/201.01–201.05, 265.01–266.1; 455/412.1–426.2, 456.1–466, 550.1–560, 455/575.1–575.9, 90.1–90.3; 704/270–278; 709/201–207, 217–248
See application file for complete search history.

(56) References Cited

U.S. PATENT DOCUMENTS

| | | | |
|---|---|---|---|
| 4,748,653 A | 5/1988 | Kerr | |
| 4,918,322 A | 4/1990 | Winter et al. | |
| 5,287,505 A | 2/1994 | Calvert et al. | |
| 5,479,487 A * | 12/1995 | Hammond | 379/88.22 |
| 5,596,634 A | 1/1997 | Fernandez et al. | |
| 5,857,015 A | 1/1999 | Salmanian | |
| 5,915,001 A | 6/1999 | Uppaluru | |
| 5,926,526 A | 7/1999 | Rapaport et al. | |
| 6,269,336 B1 | 7/2001 | Ladd et al. | |
| 6,292,783 B1 | 9/2001 | Rohler et al. | |
| 6,314,402 B1 | 11/2001 | Monaco et al. | |
| 6,324,513 B1 | 11/2001 | Nagai et al. | |
| 6,385,584 B1 | 5/2002 | McAllister et al. | |
| 6,449,341 B1 | 9/2002 | Adams et al. | |
| 6,516,055 B1 | 2/2003 | Bedeski et al. | |
| 6,539,080 B1 | 3/2003 | Bruce et al. | |
| 6,567,805 B1 | 5/2003 | Johnson et al. | |
| 6,580,904 B2 | 6/2003 | Cox et al. | |
| 6,795,543 B1 | 9/2004 | Cartier et al. | |
| 6,816,576 B2 | 11/2004 | Kasvand et al. | |
| 6,829,236 B1 | 12/2004 | Archer | |
| 6,895,084 B1 | 5/2005 | Saylor et al. | |
| 7,110,949 B2 | 9/2006 | Bushey et al. | |
| 8,027,458 B1 * | 9/2011 | Pollock | 379/265.12 |
| 2001/0006890 A1 | 7/2001 | Ryu | |
| 2001/0024497 A1 | 9/2001 | Campbell et al. | |

(Continued)

*Primary Examiner* — Hemant Patel

(57) ABSTRACT

In accordance with one embodiment, a method for operating a telephonic voice content system is provided. The method, comprises in a non-live agent mode, interacting with a caller by receiving an utterance from the caller, performing a machine selection of voice content to play to the caller based on the utterance, and playing the machine-selected voice content to the caller; and upon receiving a request to speak to a live agent from the caller, switching to a live agent mode wherein a live agent holds a conversation with the caller, and selects voice content to play to the caller based on the conversation; and switching to the non-live agent mode and playing the live agent-selected voice content to the caller.

12 Claims, 2 Drawing Sheets

(56) References Cited

U.S. PATENT DOCUMENTS

| | | |
|---|---|---|
| 2001/0049688 A1 | 12/2001 | Fratkina et al. |
| 2002/0154153 A1 | 10/2002 | Messinger et al. |
| 2002/0188599 A1 | 12/2002 | McGreevy |
| 2003/0115591 A1 | 6/2003 | Weissmueller et al. |
| 2003/0182124 A1 | 9/2003 | Khan |
| 2003/0235282 A1 | 12/2003 | Sichelman et al. |
| 2004/0033799 A1 | 2/2004 | Fontius |
| 2004/0083092 A1 | 4/2004 | Valles |
| 2004/0110490 A1 | 6/2004 | Steele et al. |
| 2005/0135335 A1 | 6/2005 | Hession et al. |

* cited by examiner

VOICE RESPONSE SYSTEM WITH LIVE AGENT ASSISTED INFORMATION SELECTION AND MACHINE PLAYBACK

CROSS REFERENCE TO RELATED APPLICATIONS

The present application is a continuation of and claims priority to U.S. patent application Ser. No. 10/819,572 filed Apr. 6, 2004 and titled VOICE RESPONSE SYSTEM WITH LIVE AGENT ASSISTED INFORMATION SELECTION AND MACHINE PLAYBACK, which is incorporated by reference herein in its entirety.

FIELD OF THE INVENTION

This invention relates to voice response systems. In particular, the invention relates to telephonic voice response systems used to play voice content to a caller.

BACKGROUND

Voice response (VR) systems may be used to provide information to callers, thereby avoiding the cost of having to provide expensive live agents to dispense the information. In general, VR systems are equipped with a telephony interface to communicate telephonically with a caller, a user interface whereby a user can input a request to the system, and a selection mechanism to select voice content to play to the caller based on the request.

With some VR systems, it is possible to transfer a call to a live agent who then converses with the caller and provides the necessary information requested by the caller. However, in some cases, the live agent provides information to the caller which information is in the VR system and can thus be provided to the caller from the system. In such cases, the use of the live agent to provide the information is a waste of resources, particularly bearing in mind the cost of having to provide live agents.

DETAILED DESCRIPTION

Embodiments of the present invention relate to a method and apparatus for serving voice content to a caller. In what is known as a non-live agent mode, a voice response system interacts with a caller by receiving a utterance from the caller, performs a machine selection of voice content to play to the caller based on the utterance and plays a machine selected voice content to the caller. During the non-live agent mode, if a request is received from the caller to speak to a live agent, the system switches to a live agent mode wherein a live agent holds a conversation with the caller and selects voice content to play to the caller based on the conversation. Thereafter, the system switches back to the non-live agent mode and plays the live agent selected voice content to the caller.

Sometimes callers may become frustrated during the non-live agent mode if the machine-selected audio content that is played to the caller during the non-live agent mode is not relevant to a request made by the caller. Thus, one advantage of the techniques disclosed herein is that the caller is afforded the opportunity to request to speak with a live agent who then determines what information the caller requires, selects that information and then enables the system to playback that information to the caller. If the information requested by the caller is not available within the system, then the live agent may dispense that information. In such a case, the system allows the live agent to record what information the caller requested that was not available within the system. Advantageously, a system administrator may later review the record and decide whether or not make the information available within the system. Other advantages of the present invention will become apparent from the description below.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
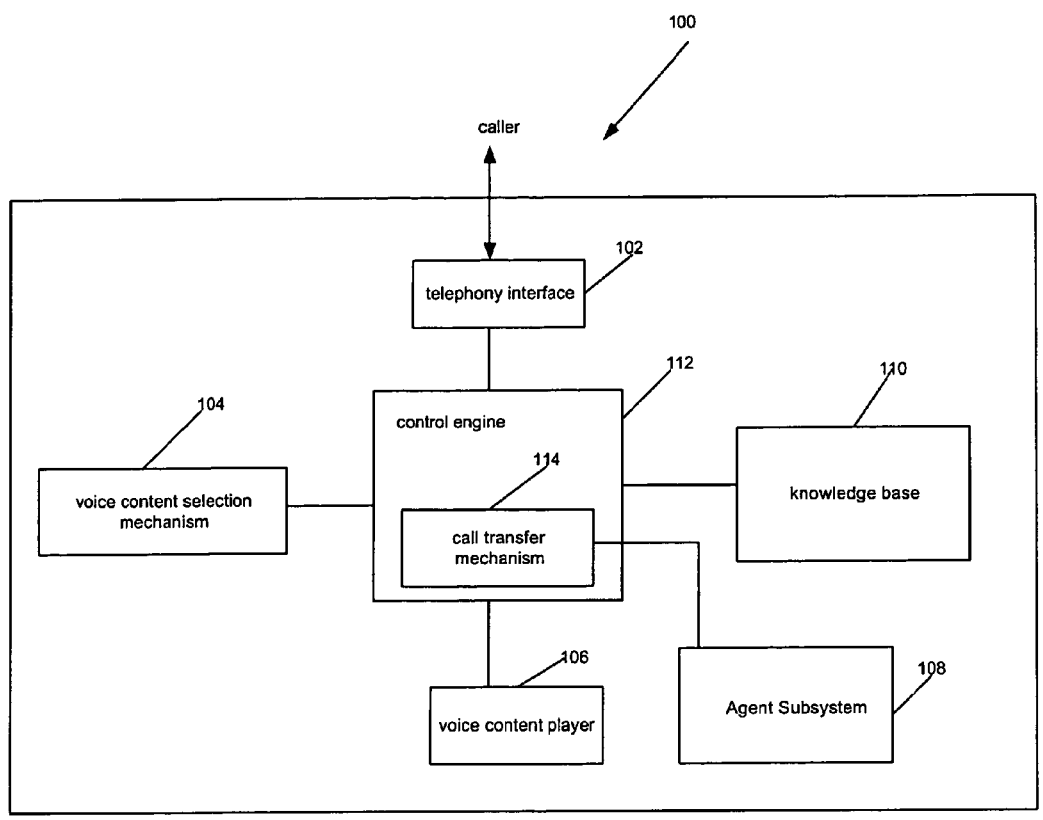
FIG. 1 shows a high-level block diagram of a system in accordance with one embodiment of the invention.

Referring now to FIG. 1 of the drawings, reference numeral 100 generally indicate a high-level system in accordance with one embodiment of the invention. The system 100 may represent a telephonic voice content system or a voice response (VR) system. As will be seen, the system 100 includes a telephony interface 102 whereby telephone calls from a caller may be received by the system 100. The system 100 also includes a voice content selection mechanism 104, a voice content player 106, an agent subsystem 108, and a knowledge base 110. Each of the components within the system 100 are under control of a control engine 112 which includes a call transfer mechanism 114.

Figure 2:
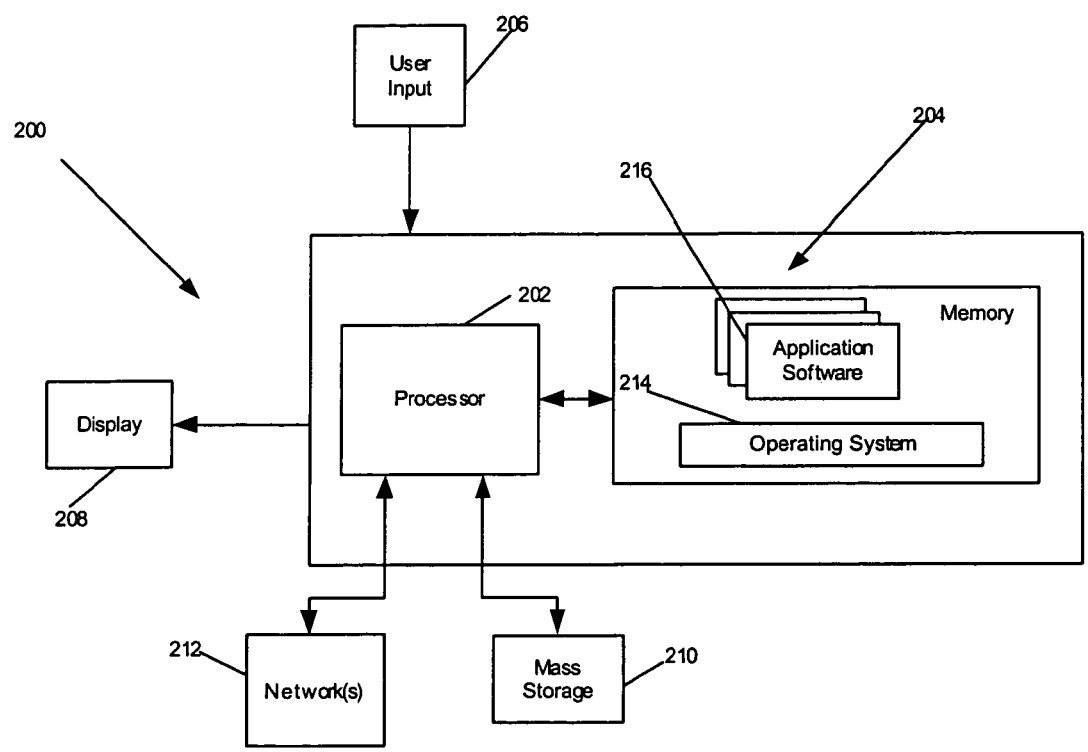
FIG. 2 shows a high-level block diagram of hardware that may be used to implement the system of FIG. 1 in accordance with one embodiment.

The system 100 may be implemented using the hardware 200 shown in FIG. 2 of the drawings.

Referring back to FIG. 1 of the drawings, the system 100 includes a non-live agent mode, and a live agent mode. In the non-live agent mode, the system 100 interacts with a caller by receiving an utterance from the caller, performing a machine selection of voice content to play to the caller based on the utterance, and plays the machine-selected audio content to the caller. For example, in one embodiment the system 100 may implement a telephonic support system that provides technical support for a consumer product such as a personal digital assistant (PDA). In such a scenario, a caller may call requiring technical support relating to for example how to synchronize the PDA with a desktop computer. In such a case, the caller 100 will utter a phrase to the system for example the phrase, "I need help with synchronization." As noted above, the system 100 receives the utterance from the caller and the voice content selection mechanism 104 selects voice content from the knowledge base 110 to play to the caller based on the utterance. In one embodiment, the knowledge base 110 is organized into topics and the voice content selection mechanism 104 performs a linguistic analysis of the utterance by the caller in order to a determine an appropriate topic within the knowledge 110 to play to the caller. In one embodiment, the voice content selection mechanism 104 selects the appropriate topic from the knowledge base 110 by correlating the utterance received from the caller with a topic within the knowledge base 110. More detail on the techniques used by the voice content selection mechanism 104 to select topics from the knowledge base 110 for playback to the caller is provided in my co-pending U.S. patent application Ser. No. 10/319,144, which is hereby incorporated by reference.

The voice content player 106 is responsible for playing back the selected topic from the knowledge base 110 to the caller. During the non-live agent mode of operation, if the system 100 receives a request from the caller to speak to a live agent, the system responds by switching to a live agent mode wherein a live agent holds a conversation with the caller. The switching to the live agent mode is handled by the call transfer mechanism 114 which transfers the telephone call to the live agent subsystem 108.

The live agent subsystem 108 may be connected to the call transfer mechanism 114 by a communication path that supports voice communications. In one embodiment, the communication path may support the Voice Over Internet Protocol (VoIP). In one embodiment, the call transfer mechanism 114 also selects a suitable live agent to speak to the caller. The selection of the suitable live agent is based upon an analysis of utterances made by the caller and system responses thereto. For example, in one embodiment, the call transfer mechanism 114 may determine that the caller is seeking technical help how to synchronize his PDA with a desktop computer and will thus select a live agent who has expertise in this technical area.

In one embodiment, when the call transfer mechanism 114 transfers the call to the agent subsystem 108, the call transfer mechanism 114 also sends the details of the utterances made by the caller and system responses to the utterances to the agent subsystem 108. The live agent may view these details on a display screen of the agent subsystem 108 and use these details to assist in the selection of an appropriate topic within the knowledge base 110 for playback to the caller. However, it is to be appreciated that these call details are only a secondary aid to content selection. The primary aid to content selection is a conversion with which the live agent holds with the caller in order to determine what information is appropriate to the caller.

In one embodiment, the call transfer mechanism 114 sends additional information besides the details of the utterances made by the caller and the system responses thereto. For example, the other information may include an identification of the caller, subject topic, operating system, etc. The identification of the caller may be in the form of a membership number or a customer identification. This additional information is available system-wide. Thus, for example, if the call has to be transferred to say a supervisor, the additional information is made available to the supervisor. This additional information is displayed by the agent subsystem 108 and can be viewed by the live agent.

In one embodiment, the live agent selects an appropriate topic playback to the caller from the knowledge base 110 based on the agent's analysis of what information the caller requires. Once a particular topic has been selected from the knowledge base 110 by the agent, with the assistance of the call transfer mechanism 114, switches the system 100 back to the non-live agent mode for playback of the live agent selected voice content to the caller using the voice content player 106.

It will be appreciated, that in some cases, the agent may determine that there is no topic within the knowledge base 110 that is appropriate to information being requested by the caller. In such cases, the agent may provide the information directly to the caller. In one embodiment, in order to improve qualify of service, the live agent subsystem 108 allows the live agent to create a log or record of information requested by callers for which no topic could be found within the knowledge base 110. This record or log may be reviewed by a system administrator in order to expand the knowledge base 110 by providing information requested by callers in respect of which the knowledge base 110 is lacking.

Referring to FIG. 2 of the drawings, reference numeral 200 generally indicates hardware that may be used to implement the VR system 100. The hardware 200 typically includes at least one processor 202 coupled to a memory 204. The processor 202 may represent one or more processors (e.g., microprocessors), and the memory 204 may represent random access memory (RAM) devices comprising a main storage of the hardware 200, as well as any supplemental levels of memory e.g., cache memories, non-volatile or back-up memories (e.g. programmable or flash memories), read-only memories, etc. In addition, the memory 204 may be considered to include memory storage physically located elsewhere in the hardware 200, e.g. any cache memory in the processor 202, as well as any storage capacity used as a virtual memory, e.g., as stored on a mass storage device 210.

The hardware 200 also typically receives a number of inputs and outputs for communicating information externally. For interface with a user or operator, the hardware 200 may include one or more user input devices 206 (e.g., a keyboard, a mouse, etc.) and a display 208 (e.g., a Cathode Ray Tube (CRT) monitor, a Liquid Crystal Display (LCD) panel).

For additional storage, the hardware 200 may also include one or more mass storage devices 210, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 200 may include an interface with one or more networks 212 (e.g., a local area network (LAN), a wide area network (WAN), a wireless network, and/or the Internet among others) to permit the communication of information with other computers coupled to the networks. It should be appreciated that the hardware 200 typically includes suitable analog and/or digital interfaces between the processor 202 and each of the components 204, 206, 208 and 212 as is well known in the art.

The hardware 200 operates under the control of an operating system 214, and executes various computer software applications 216, components, programs, objects, modules, etc. (e.g. a program or module which performs operations is described with reference to FIG. 1 of the drawings). Moreover, various applications, components, programs, objects, etc. may also execute on one or more processors in another computer coupled to the hardware 200 via a network 212, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.).

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
    upon receiving a telephone call from a caller, switching to interacting with the caller in a non-live agent mode;
    processing the call in the non-live agent mode;
    receiving an utterance from the caller;
    performing a machine selection of voice content to play to the caller based on the utterance by performing a linguistic analysis of the utterance by the caller to determine an appropriate topic among a plurality of relevant subject topics within a text knowledge base to play to the caller;
    creating a navigation topic question comprising a plurality of different subject topics related to the appropriate topic and forwarding the navigation topic question to the caller;
    receiving a subject topic selection among the plurality of different subject topics and identifying the machine-selected voice content to play to the caller based on the subject topic selection;
    playing the identified machine-selected voice content to the caller based on the determined appropriate topic in the text knowledge base;
    while in the non-live agent mode, upon receiving a request to speak to a live agent from the caller, switching to a live agent mode wherein a live agent holds a conversation with the caller, wherein said switching to a live agent mode comprises selecting the live agent based on expertise of the live agent to answer questions by the caller; and
    selectively switching to the non-live agent mode and playing the live agent-selected voice content to the caller.

2. The method of claim 1, wherein switching to the live agent mode comprises sending details of utterances by the caller and system responses to the utterances during the non-live agent mode to the live agent.

3. The method of claim 1, wherein selecting the live agent comprises analyzing utterances of the caller during the non-live agent mode to determine the expertise of the live agent.

4. A method, comprising:
    upon receiving a telephone call from a caller, switching to interacting with the caller in a non-live agent mode;
    processing the call in the non-live agent mode
    receiving at least one utterance from the caller;
    performing a machine selection operation wherein the utterance is analyzed and correlated to a topic within a text knowledge base by performing a linguistic analysis of the utterance by the caller in order to a determine an appropriate topic among a plurality of relevant subject topics within the text knowledge base to play to the caller;
    creating a navigation topic question comprising a plurality of different subject topics related to the appropriate topic and forwarding the navigation topic question to the caller;
    receiving a subject topic selection among the plurality of different subject topics and identifying the machine-selected voice content to play to the caller based on the subject topic selection;
    playing the identified machine-selected voice content relating to the topic to the caller based on the determined appropriate topic in the text knowledge base;
    while in the non-live agent mode, receiving a request to speak to a live agent from the caller
    switching to a live-agent mode comprising analyzing utterances of the caller to determine what expertise is needed by a live agent in order to answer questions by the caller;
    selecting a live agent with the expertise;
    transferring the caller to the selected live agent who then holds a conversation with the caller and determines what information the caller requires, wherein the agent selects a topic from the text knowledge base corresponding to the information if the topic exists; and
    selectively switching back to the non-live agent mode and playing the selected topic to the caller.

5. The method of claim 4, wherein if no topic exists in the knowledge base corresponding to the required information then the live agent provides the information to the caller.

6. The method of claim 5, further comprising composing a log entry of the required information for which no topic exists in the knowledge base.

7. The method of claim 4, further comprising sending details of the utterances of the caller and responses thereto by the voice response system to the live agent.

8. A system, comprising:
    a database that includes a text knowledge base organized into topics;
    a telephony interface to receive a telephone call;
    a non-live agent processor to handle the telephone call wherein a voice content selection mechanism selects a topic based on a correlation of an utterance received from the caller to a topic in the text knowledge base the correlation including a linguistic analysis of the utterance by the caller to determine an appropriate topic among a plurality of relevant subject topics within the text knowledge base to play to the caller, and create a navigation topic question comprising a plurality of different subject topics related to the appropriate topic and forward the navigation topic question to the caller, and receive a subject topic selection among the plurality of different subject topics and identify the machine-selected voice content to play to the caller based on the subject topic selection;
    a voice content player that plays the identified machine-selected voice content related to the topic to the caller; and
    a call transfer mechanism to transfer the telephone call to a live agent, selected to have expertise to answer questions by the caller based on analysis of utterances by the caller to determine said expertise, if requested by the caller for a selection of a topic from the knowledge base based on a request for information by the caller; wherein the live agent provides the information if there is not topic in the knowledge base to match the information; and to selectively switch the system back to the non-live agent mode for initiate playback of the live agent selected voice content by the voice content player.

9. The system of claim 8, wherein the call transfer mechanism transfers the telephone call to the live agent in response to a request from the caller.

10. The system of claim 8, further comprising a logging mechanism wherein the live agent can log information requested by the caller for which no topic exists in the knowledge base.

11. The system of claim 9, wherein the call transfer mechanism sends call details comprising utterances made by the caller and system responses thereto prior to the transfer.

12. The system of claim 8, further comprising a display unit to display the call details.

\* \* \* \* \*